(12) United States Patent
McDaid et al.

(10) Patent No.: US 6,422,442 B1
(45) Date of Patent: Jul. 23, 2002

(54) BICYCLE LOCK HOLDER

(75) Inventors: Cornelius McDaid, Dorchester; John D. Fiegener, Mendon; Robert D. Zuraski, Taunton, all of MA (US)

(73) Assignee: Kryptonite Corporation, Canton, MA (US)

( * ) Notice: Subject to any disclaimer, the term of this patent is extended or adjusted under 35 U.S.C. 154(b) by 0 days.

(21) Appl. No.: 09/667,929

(22) Filed: Sep. 22, 2000

(51) Int. Cl.[7] ................................................. B62J 11/00
(52) U.S. Cl. ............................. 224/441; 70/49; 70/233; 224/442; 224/443; 224/447; 224/451; 224/459; 224/935
(58) Field of Search ................................ 224/441, 442, 224/443, 447, 451, 459, 935; 70/233, 49

(56) References Cited

U.S. PATENT DOCUMENTS

| | | | | |
|---|---|---|---|---|
| 5,386,961 A | * | 2/1995 | Lu | 248/223.4 X |
| 5,647,520 A | * | 7/1997 | McDaid | 224/451 X |
| 5,669,536 A | * | 9/1997 | Wang | 224/443 |
| 6,044,669 A | * | 4/2000 | Levi | 70/49 X |
| 6,095,386 A | * | 8/2000 | Kuo | 224/935 X |

* cited by examiner

Primary Examiner—Stephen K. Cronin
Assistant Examiner—Maerena W. Brevard
(74) Attorney, Agent, or Firm—Morse, Altman & Martin

(57) ABSTRACT

A U-lock holder for stowing a U-lock on a bicycle frame. The holder comprises a brace for connection to a leg of the U-lock, and a bracket for connection to a part of the bicycle frame. The brace and the bracket are adapted for engagement and disengagement with and from each other. The brace includes a collar, a tongue, and opposed intermediate articulations between the collar and the tongue. The bracket includes a mount, a channel, a saddle, and opposed intermediate guides between the channel and the saddle. The collar is adapted to receive and to be affixed to a leg of the U-lock. The mount is adapted to abut against the bicycle frame. A strap tightly affixes the bracket to the bicycle frame. Mating of the brace and the bracket effect simultaneous engagement of (1) the tongue and the articulations of the brace, and (2) the channel and the guides of the bracket.

10 Claims, 7 Drawing Sheets

BICYCLE LOCK HOLDER

BACKGROUND OF THE INVENTION

1. Field of the Invention

The present invention relates to holders for temporarily stowing bicycle locks, e.g. U-locks and cable locks, when not in use, and for releasing the locks for ready use when needed. Such U-locks arc of the type having a shackle and a crossbar as mating parts. Such cable locks are of the type having a cable and an end bar as mating parts. The mating parts are adapted to tie the frame of a parked bicycle to a secure post or other station.

2. The Prior Art

Since the invention of bicycle U-locks and cable locks, a variety of holders have been proposed for removably carrying such a lock when the bicycle is in use, rather than parked. Such a U-lock typically comprises a semi-enclosure member or shackle having legs or fittings with configured feet, a straight crossbar having openings for reception of these feet, and a locking mechanism in the crossbar for retaining or releasing these feet. Such a cable lock typically comprises a cable having at one end a leg or fitting with a configured foot, a bar extending from the other end of the cable and having an opening for reception of this foot, and a locking mechanism in the bar for retaining or releasing this foot. For protection against theft, this tie lock assemblage ties a strut or the like of the bicycle to a post, rail or other station.

The objectives of a holder for such locks are to carry the a lock securely on the bicycle frame without rattling, to position the lock inconspicuously on the bicycle frame without hindering movement of the cyclist, and yet to facilitate convenient release of the lock from the holder whenever needed. Prior art holders have not completely met these objectives.

There now exist a variety of brackets for removably attaching a lock to the bicycle frame. These brackets generally are either single-part or two-part devices. In U.S. Pat. No. 5,076,526, a single-part bracket has a pair of opposed contoured clamps. One clamp attaches to the bicycle frame and the other clamp has an L-shaped opening for holding the lock. The crossbar of an assembled U-lock is inserted into the vertical portion of the opening and is rotated until the shackle is aligned with the horizontal portion of the opening, and then is inserted into the horizontal portion. The U-lock is held in place by a snap action facilitated by small protrusions at the top of the horizontal portion. In U.S. Pat. No. 4,736,921, a U-lock is held in place by the camming action of a lever that presses the sides against the shackle of the lock. A typical two-part bracket is disclosed in German Patent No. DE4312033A, in which one part of the bracket mounts to the bicycle and the other part attaches to the lock. The two parts removably connect together by a tongue-in-groove mechanism whereby the tongue of the lock-attached pad slides into a groove in the cycle-mounted part. The two parts are kept from separating by a flexible strip that snaps into a slot in the tongue. The two parts are separated by pressing together the ends of the strip so that it beads out of the slot and sliding the tongue out of the groove.

While these prior art brackets achieve their intended function, each has its drawbacks. Such drawbacks include (1) a loose fit so that the lock rattles when riding the bicycle (2) only one viable bicycle mounting position because there is only one way that the U-lock can be attached to the bracket, (3) a safety issue wherein the U-lock can be ejected from the bracket during an accident causing injury, and (4) moving parts that can jam if they become dirty.

SUMMARY OF THE INVENTION

The primary object of the present invention is to provide, for temporarily stowing a bicycle lock on a strut of a bicycle frame, a lock holder comprising a brace and a bracket as follows. The brace securely connects to a leg of the U-lock. The bracket securely connects to the frame of the bicycle. The brace and the bracket are particularly designed for easy engagement and disengagement with and from each other. The brace includes, as paraxial components: a collar, a tongue, and intermediate articulations between the collar and the tongue. The bracket includes, as paraxial components: a mount, a channel, a saddle, and intermediate guides between the channel and the saddle. The collar is adapted to receive and to be tightly affixed by a set screw to a leg of the lock. The mount is adapted to abut against a part of a bicycle from and to be affixed thereto by a strap, which extends between edges of the mount. The tightness of the strap can be macro-tightened at one end of the strap by a linear ratchet that cooperates with a catch on the bracket, and can be micro-tightened at the other end of the strap by a nut and screw that coact between the strap and the bracket. When the collar is affixed to the lock leg and the mount is affixed to a bicycle strut, snug engagement and easy disengagement of the brace and the bracket can be effected. The arrangement is such as to facilitate smooth simultaneous engagement: (1) between the tongue of the brace and the channel of the bracket; and (2) between the guides of the bracket and the articulations in the brace. The arrangement is such as to facilitate smooth simultaneous disengagement: (1) between the tongue of the brace and the channel of the bracket, and (2) between the guides of the bracket and the articulations in the brace. With such simultaneous engagement, the lock is securely and unobtrusively stowed on the bicycle frame. With such simultaneous disengagement, the lock is readily available for tying the bicycle to a secure post or other station.

Other objects of the present invention will in part be obvious and will in part hereinafter.

BRIEF DESCRIPTION OF THE DRAWINGS

For a fuller understanding of the nature and objects of the present invention, reference is made to the following description, which is to be taken in connection with the accompanying drawings, wherein:

FIG. 11 is a front elevation view of the bracket of FIGS. 7, 8 and 9;

DETAILED DESCRIPTION OF A PREFERRED EMBODIMENT

Figure 1:
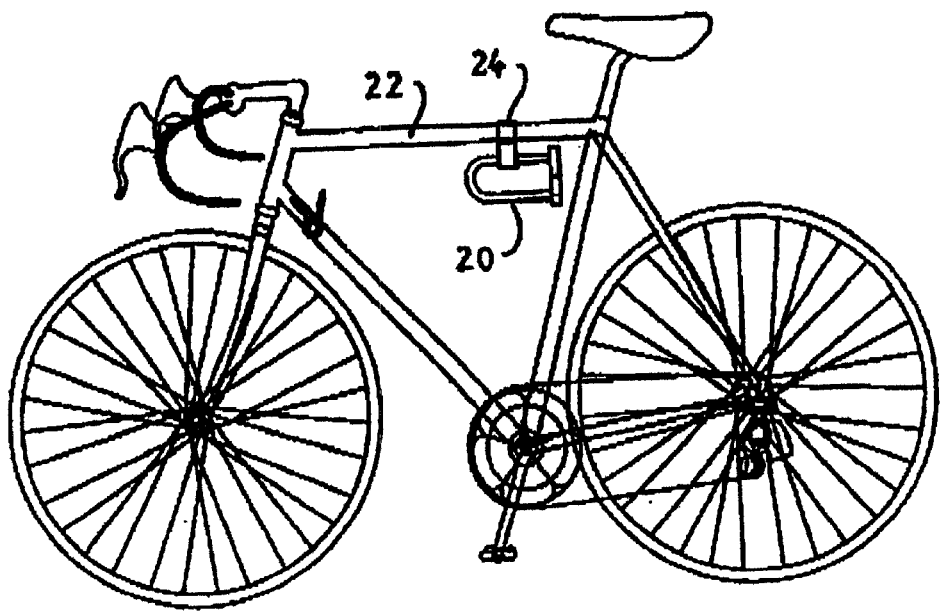
FIG. 1 shows a bicycle that mounts a holder and a U-lock stowed thereby in accordance with the present invention.
Figure 2:
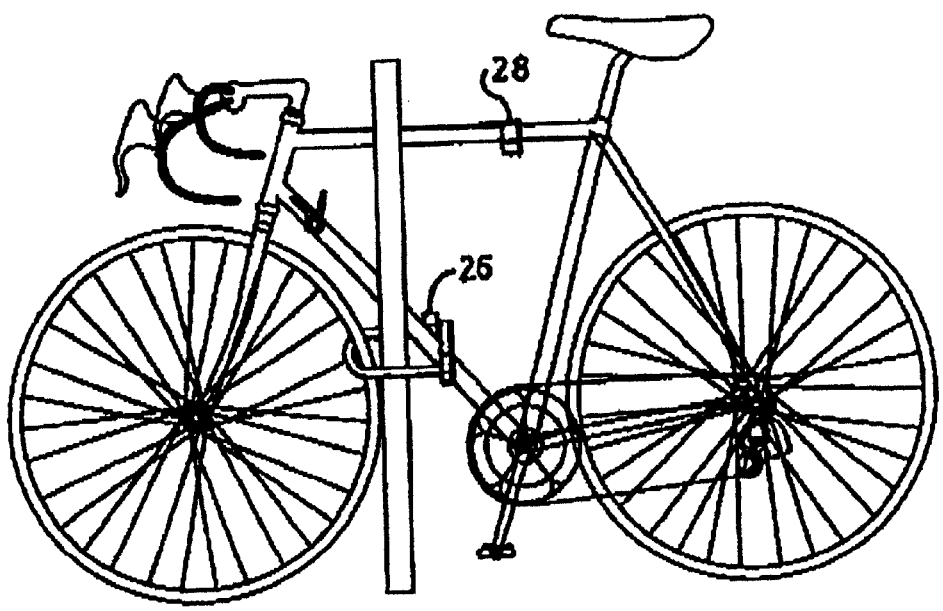
FIG. 2 shows the bicycle of FIG. 1 parked and secured by the U-lock of FIG. 1, with disengaged brace and bracket components of the holder respectively mounted on the U-lock and the bicycle pursuant of the present invention.
Figure 3:
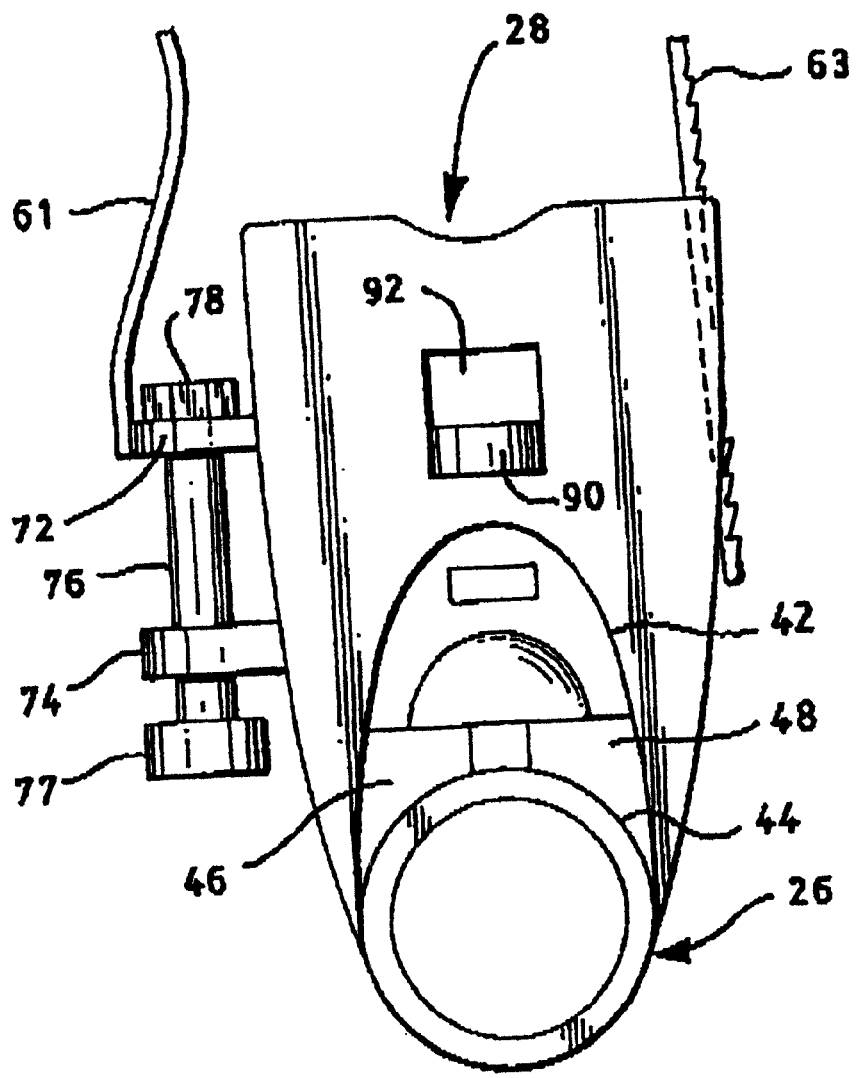
FIG. 3 is an assembly cross-section of the holder of the present invention.
Figure 4:
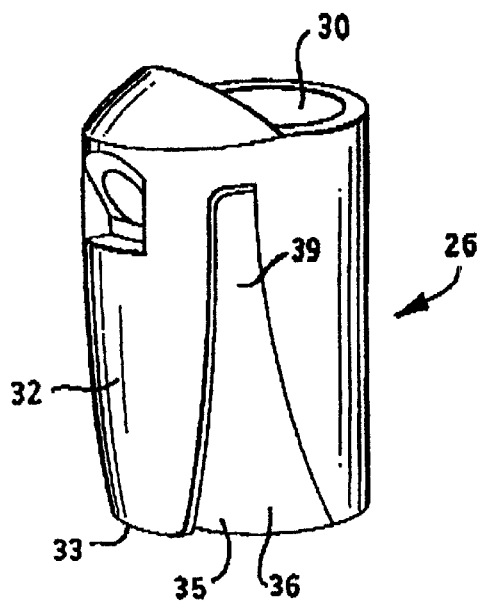
FIG. 4 is an anterior perspective view of a brace for attachment to a leg of the shackle of the U-lock shown in FIGS. 1 and 2.
Figure 5:
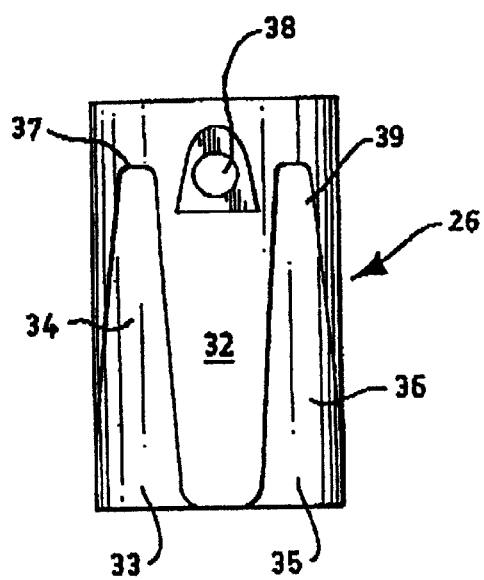
FIG. 5 is a front elevation view of the brace as shown in FIG. 4.
Figure 6:
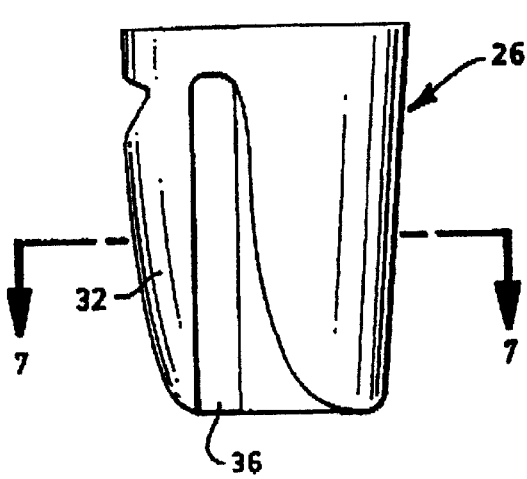
FIG. 6 is a side view of the brace as shown in FIG. 5.
Figure 7:
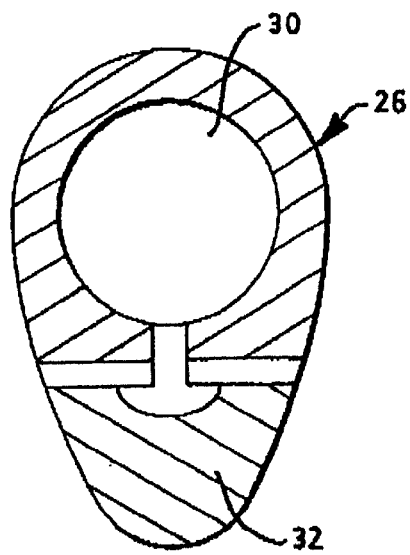
FIG. 7 is a cross-sectional view of the brace, taken along the lines 7—7 of FIG. 6.
Figure 8:
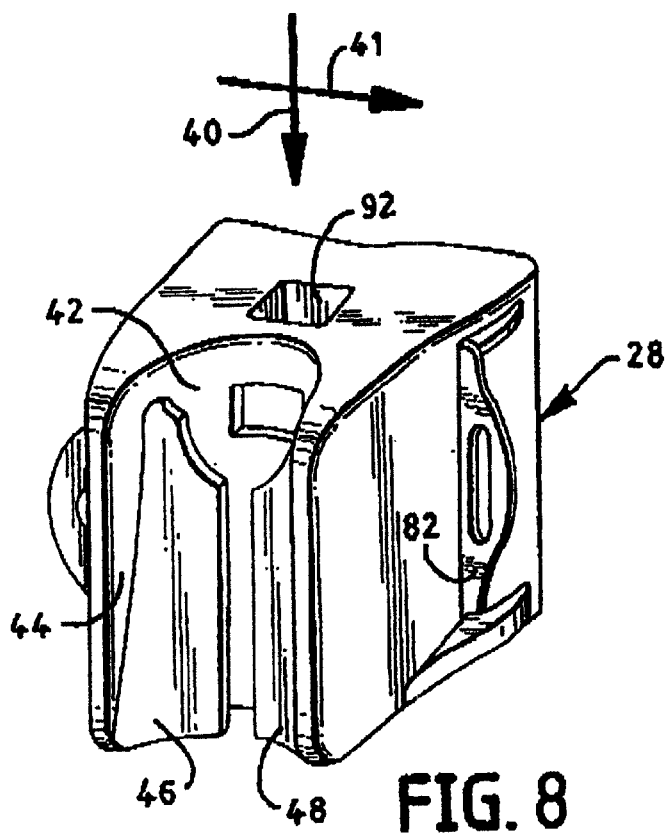
FIG. 8 is an anterior perspective view of a bracket for attachment to a strut of a bicycle as shown in FIGS. 1 and 2.
Figure 9:
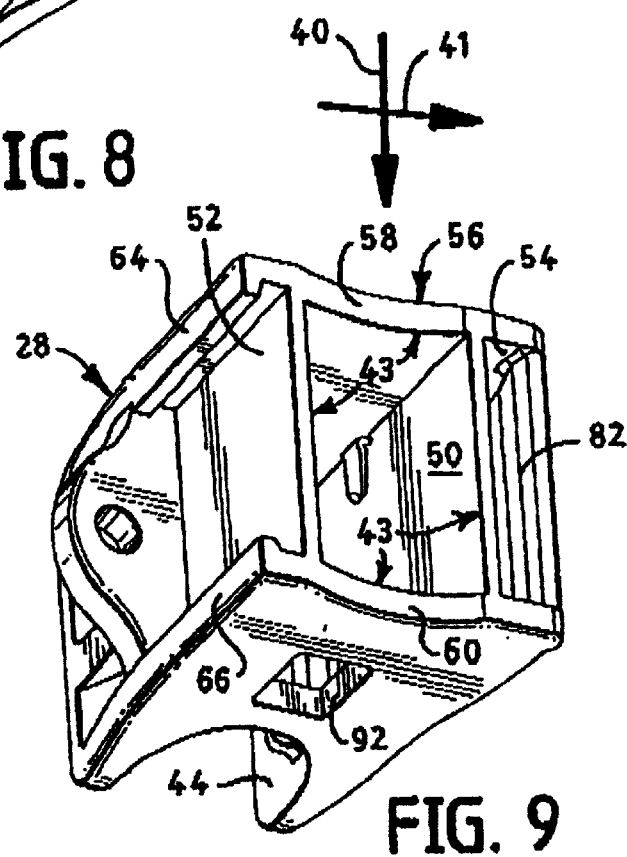
FIG. 9 is a downward perspective view of the bracket of FIG. 8.
Figure 10:
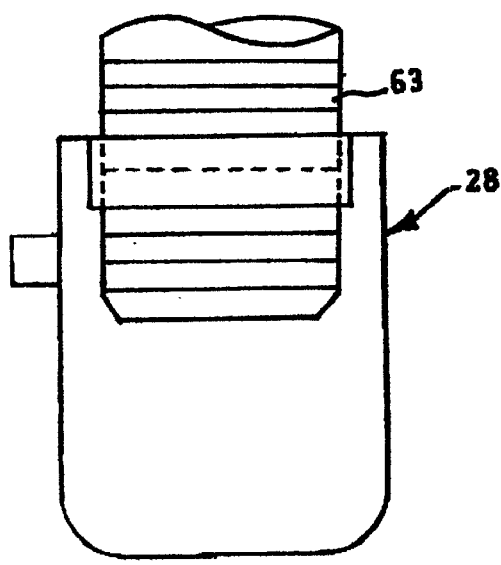
FIG. 10 is a front elevation view of the bracket of FIGS. 8 and 9.
Figure 11:
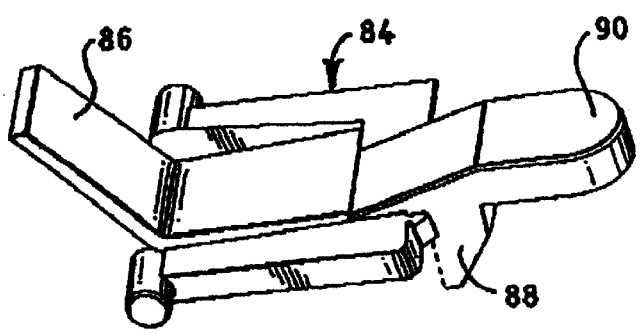
FIG. 11 is a perspective view of an insert contained by the bracket as shown in FIGS. 8, 9 and 10.
Figure 12:
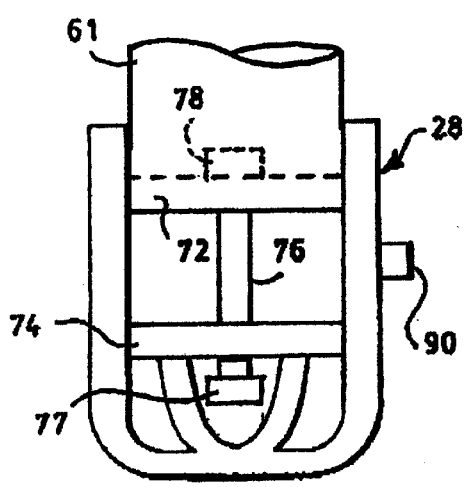
FIG. 12 is a rear view of the bracket as shown in FIG. 11.
Figure 13:
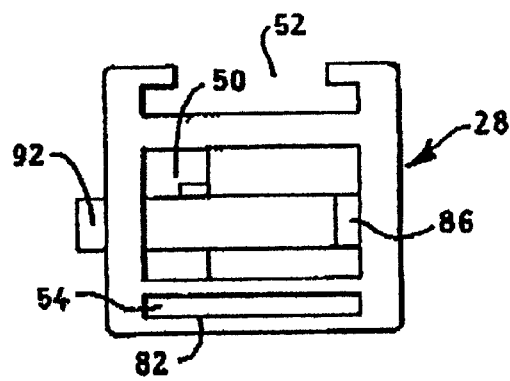
FIG. 13 is a top view of the bracket as shown in FIG. 11.
Figure 14:
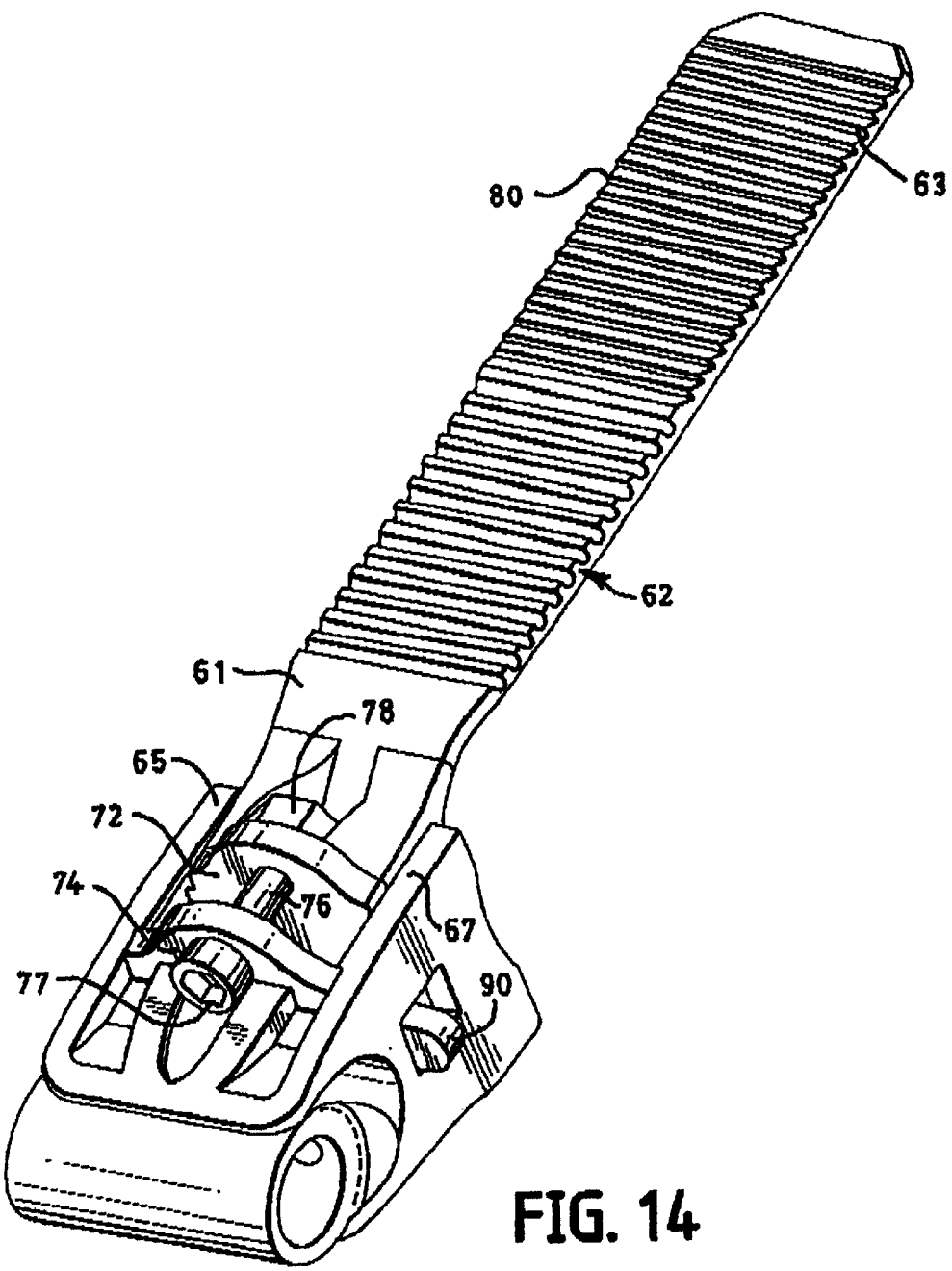
FIG. 14 is an assembly perspective view of the brace, bracket and strap of the holder of the present invention.

FIGS. 1 and 2 show a U-lock 20 held on a strut 22 of a bicycle frame by a holder 24, which comprises a brace 26 and a bracket 28. Brace 26 is securely connected to a leg of U-lock 20. Bracket 28 is securely connected to a strut 22 of the bicycle frame. The brace and the bracket are particularly designed for easy engagement with each other, and for easy disengagement from each other. With engagement, U-lock 20 may be securely and unobtrusively stowed on the bicycle frame as shown in FIG. 1. With disengagement, the U-lock is readily available for tying the bicycle to a secure post or other station as shown in FIG. 2.

The brace includes, as paraxially distributed components: a collar portion 30, a tongue portion 32, and intermediate articulated portions 34, 36 between the collar portion and the tongue portion. Collar portion 30 is adapted to receive a leg of U-lock 20. Collar portion 30 is adapted to be tightly fixed to this leg by a threaded bore and set screw arrangement 38. Tongue portion 32 tapers inwardly along its axis in three dimensions, from its rearward to its forward extremities. Articulated portions 34, 36, for purposes to be described below, are grooved slides that are open at their forward extremities 33, 35 and are blocked at their rearward extremities 37, 39.

Bracket 28 includes a base, which incorporates internal and external features that are distributed variously along two orthogonal axes 40, 41. Forwardly, bracket 28 paraxially defines along one orthogonal axis 40: a channel portion 42, a saddle portion 44, and intermediate guide portions 46, 48 between the channel portion and the saddle portion. Rearwardly, bracket 28 has reticulations 43, which define in sequence along the other orthogonal axis, a central cavity 50, a pair of parallel slots 52, 54 at opposite sides of cavity 50, and a seat 56 between slots 52, 54. Seat 56, which is adapted for abutment against a curved component of the bicycle frame, is presented by slightly reentrant edges 58, 60 of the reticulations. These edges extend in parallel transversely between slots 52, 54. Extending between slots 52,54 is a strap 62, which is anchored at one end 61 and free at the other end 63.

Anchored end 61 of strap 62 has parallel guides 64, 66 at its opposite edges. Affixed to anchored end 61 of strap 62 is a flange 72. Affixed to bracket 28 across slot 52 is a flange 74. Flange 72 moves with the anchored end 61 under the constraint of guides 64, 66 toward or away from flange 74. Flanges 72, 74 have aligned holes that receive a screw 76. One end of screw 76 has a head 77 that abuts against one of flanges 72, 74. The other end of screw 76 is turned into a threaded nut 78 that abuts against the other of flanges 72, 74.

Free end 63 of strap 62 has a series of transverse ridges 80, the leading faces of which are obliquely oriented with respect to the general surface of the strap and the trailing faces of which are perpendicularly oriented with respect to the general surface of the strap. An outer edge of slot 54 is provided with a catch 82. Ridges 80 and catch 82 constitute a ratchet, which permits the free end of strap 62 to be slipped into slot 54 but prevents retraction of strap 62 from slot 54.

Seat 56 is adapted to abut against a part of a bicycle frame and to be affixed thereto by strap 62. The tightness of the strap can be macro-tightened at the free end of the strap by the ratchet arrangement, and can be micro-tightened at the anchored end of the strap by flange and screw arrangement 72, 74 and 76.

An insert 84 is press fitted into cavity 50 of the bracket so that an elbow spring 86 biases a hook 88 into engagement with notch 38 of brace 26 when the brace and bracket are mated. A thumb switch 90 which protrudes from cavity 50 through an opening 92 releases hook 88 from notch 38 when pressed. When the collar is affixed to the U-lock leg and the mount is affixed to a bicycle strut 20, snug engagement and easy disengagement of the brace and the bracket can be effected.

Figure 15:
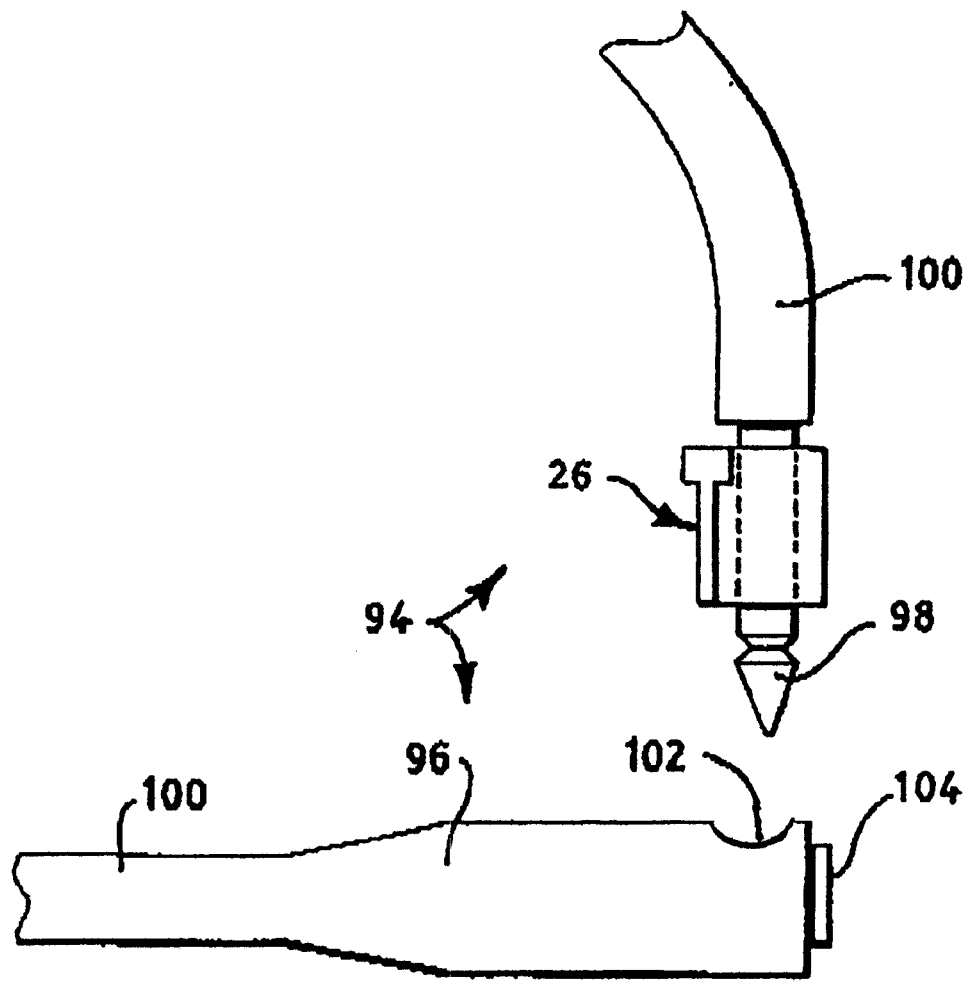
FIG. 15 is a fragmentary view of a cable lock, to which is fastened a brace of the holder of the present invention.

FIG. 15 illustrates the use of the holder of the present invention with a cable lock 94, which includes a leg 96, a configured foot 98 and a cable 100 connecting the end bar and the foot. Foot 98 is adapted for insertion into an opening 102 in the leg for capture by a key-controlled lock mechanism 104. Affixed to foot 98 is a brace 26, which can be mated with the bracket of FIGS. 1 and 2 to enable cable lock 94 to be stowed on the bicycle frame in the same manner as U-lock 20.

The arrangement is such as to facilitate smooth simultaneous engagement: (1) between the tongue of the brace and the channel of the bracket, and (2) between the guides of the bracket and the articulations in the brace. The arrangement is such as to facilitate smooth simultaneous disengagement: (1) between the tongue of the brace and the channel of the bracket, and (2) between the guides of the bracket and the articulations in the brace.

OPERATION

Thus, the lock holder of the present invention comprises a brace and a bracket for temporarily stowing a U-lock or cable lock on a strut of a bicycle frame. The brace securely connects to a leg of the lock. The bracket securely connects to the frame of the bicycle. The brace and the bracket are particularly designed for easy engagement and disengagement with and from each other. The brace includes, as paraxial components: a collar, a tongue, and intermediate articulations between the collar and the tongue. The bracket includes, as paraxial components: a mount, a channel, a saddle, and intermediate guides between the channel and the saddle. The collar is adapted to receive and to be tightly affixed by a set screw to a leg of the lock. The mount is adapted to abut against a part of a bicycle frame and to be affixed thereto by a strap. The tightness of the strap can be macro-tightened at one end of the strap by a linear ratchet that cooperates with a catch on the bracket, and can be micro-tightened at the other end of the strap by a coacting nut and screw. When the collar is affixed to the lock leg and the mount is affixed to a bicycle strut, snug engagement and easy disengagement of the brace and the bracket can be effected. With such simultaneous engagement, the lock is securely and unobtrusively stowed as shown in FIG. 1. With such simultaneous disengagement, the lock is readily available for tying the bicycle to a secure post or other station as shown in FIG. 2.

What is claimed is:

1. A lock holder for stowing a lock on a bicycle frame, said holder comprising a brace for connection to a leg of said lock, and a bracket for connection to a part of said bicycle frame, said brace and said bracket being adapted for engagement and disengagement with and from each other:
   (a) said brace including a collar, a tongue, and opposed intermediate articulations between said collar and said tongue, said tongue tapering inwardly along its axis in three dimensions from its rearward extremity to its forward extremity, said articulations constituting grooved slides that are open at their forward extremities and are blocked at their rearward extremities;
   (b) said bracket including a mount, a channel, a saddle, and opposed intermediate guides between said channel and said saddle;
   (c) said collar being adapted to receive and to be affixed to a leg of said lock;
   (d) said mount being adapted to abut against said bicycle frame, and a strap for tightly affixing said bracket to said part of said bicycle frame;
   (e) mating of said brace and said bracket effecting simultaneous engagement of (1) said tongue and said articulations of said brace, and (2) said channel and said guides of said bracket.

2. A lock holder for stowing a lock on a bicycle frame, said holder comprising a brace for connection to a leg of said lock, and a bracket for connection to a part of said bicycle frame, said brace and said bracket being adapted for engagement and disengagement with and from each other:
   (a) said brace including a collar, a tongue, and opposed intermediate articulations between said collar and said tongue, said tongue tapering inwardly along its axis in three dimensions from its rearward extremity to its forward extremity, said articulations constituting grooved slides that are open at their forward extremities and are blocked at their rearward extremities;
   (b) said bracket including a mount, a channel, a saddle, and opposed intermediate guides between said channel and said saddle;
   (c) said collar being adapted to receive and to be affixed to a leg of said lock;
   (d) said mount being adapted to abut against said bicycle frame, and a strap for tightly affixing said bracket to said part of said bicycle frame;
   (e) mating of said brace and said bracket effecting simultaneous engagement of (1) said tongue and said articulations of said brace, and (2) said channel and said guides of said bracket; and
   (f) said collar having a threaded bore and a set screw that turns into said threaded bore.

3. A lock holder for stowing a lock on a bicycle frame, said holder comprising a brace for connection to a leg of said lock, and a bracket for connection to a part of said bicycle frame, said brace and said bracket being adapted for engagement and disengagement with and from each other:
   (a) said brace including a collar, a tongue, and opposed intermediate articulations between said collar and said tongue;
   (b) said bracket including a mount, a channel, a saddle, and opposed intermediate guides between said channel and said saddle;
   (c) said collar being adapted to receive and to be affixed to a leg of said lock;
   (d) said mount being adapted to abut against said bicycle frame, and a strap for tightly affixing said bracket to said part of said bicycle frame;
   (e) mating of said brace and said bracket effecting simultaneous engagement of (1) said tongue and said articulations of said brace, and (2) said channel and said guides of said bracket; and
   (f) said strap extending between edges of said mount, one end of said strap and one edge of said mount providing a ratchet connection for coarse tightening of said strap about said part of said bicycle frame.

4. A lock holder for stowing a lock on a bicycle frame, said holder comprising a brace for connection to a leg of said lock, and a bracket for connection to a part of said bicycle frame, said brace and said bracket being adapted for engagement and disengagement with and from each other:
   (a) said brace including a collar, a tongue, and opposed intermediate articulations between said collar and said tongue;
   (b) said bracket including a mount, a channel, a saddle, and opposed intermediate guides between said channel and said saddle;
   (c) said collar being adapted to receive and to be affixed to a leg of said lock;
   (d) said mount being adapted to abut against said bicycle frame, and a strap for tightly affixing said bracket to said part of said bicycle frame;
   (e) mating of said brace and said bracket effecting simultaneous engagement of (1) said tongue and said articulations of said brace, and (2) said channel and said guides of said bracket; and
   (f) said strap extending between edges of said mount, one end of said strap and one edge of said mount providing a threaded connection for fine tightening of said strap about said part of said bicycle frame.

5. A lock holder for stowing a lock on a bicycle frame, said holder comprising a brace for connection to a leg of said lock, and a bracket for connection to a part of said bicycle frame, said brace and said bracket being adapted for engagement and disengagement with and from each other:
   (a) said brace including a collar, a tongue, and opposed intermediate articulations between said collar and said tongue,
   (b) said bracket including a mount, a channel, a saddle, and opposed intermediate guides between said channel and said saddle;
   (c) said collar being adapted to receive and to be affixed to a leg of said U-lock;
   (d) said mount being adapted to abut against said bicycle frame, and a strap for tightly affixing said bracket to said part of said bicycle frame;
   (e) mating of said brace and said bracket effecting simultaneous engagement of (1) said tongue and said articulations of said brace, and (2) said channel and said guides of said bracket; and
   (f) a ratchet connection including a sequence of deformable ridges on said strap and a slot with a catch on said mount, leading edges of said ridges being sloped with respect to the plane of said strap to enable insertion of said strap into said slot, trailing edges of said ridges being substantially orthogonal with respect to the plane of said strap to prevent withdrawal of said strap from said slot.

6. A lock holder for stowing a lock on a bicycle frame, said holder comprising a brace for connection to a leg of said lock, and a bracket for connection to a part of said bicycle frame, said brace and said bracket being adapted for engagement and disengagement with and from each other:

(a) said brace including a collar, a tongue, and opposed intermediate articulations between said collar and said tongue;

(b) said bracket including a mount, a channel, a saddle, and opposed intermediate guides between said channel and said saddle;

(c) said collar being adapted to receive and to be affixed to a leg of said lock;

(d) said mount being adapted to abut against said bicycle frame, and a strap for tightly affixing said bracket to said part of said bicycle frame;

(e) mating of said brace and said bracket effecting simultaneous engagement of (1) said tongue and said articulations of said brace, and (2) said channel and said guides of said bracket;

(f) said collar having a threaded bore and said set screw turning into said threaded bore;

(g) said strap extending between edges of said mount, one end of said strap and one edge of said mount providing a ratchet connection for coarse tightening of said strap about said part of said bicycle frame;

(h) said strap extending between edges of said mount, one end of said strap and one edge of said mount provided a threaded connection for fine tightening of said strap about said part of said bicycle frame;

(i) said ratchet connection including a sequence of deformable ridges on said strap and a slot with a catch on said mount, leading edges of said ridges being sloped with respect to the plane of said strap to enable insertion of said strap into said slot, trailing edges of said ridges being substantially orthogonal with respect to the plane of said strap to prevent withdrawal of said strap from said slot.

7. A U-lock holder for stowing a U-lock on a part of a movable object, said holder comprising a brace for connection to a leg of said U-lock, and a bracket for connection to said part of said movable object, said brace and said bracket being adapted for engagement and disengagement with and from each other:

(a) said brace including a collar, a tongue, and opposed intermediate articulations between said collar and said tongue, (b) said bracket including a mount, a channel, a saddle, and opposed intermediate guides between said channel and said saddle;

(c) said collar being adapted to receive and to be affixed to a leg of said U-lock;

(d) said mount being adapted to abut against said part of said movable object, and a strap for tightly affixing said bracket to said part of said movable object;

(e) mating of said brace and said bracket effecting simultaneous engagement of (1) said tongue and said articulations of said brace, and (2) said channel and said guides of said bracket;

(f) said collar having a threaded bore and a set screw that turns into said threaded bore.

8. A cable-lock holder for stowing a cable-lock on a part of a movable object, said holder comprising a brace for connection to a part of said cable-lock, and a bracket for connection to a part of said moveable object, said brace and said bracket being adapted for engagement and disengagement with and from each other;

(a) said brace including a collar, a tongue, and opposed intermediate articulations between said collar and said tongue;

(b) said bracket including a mount, a channel, a saddle, and opposed intermediate guides between said channel and said saddle;

(c) said collar being adapted to receive and to be affixed to said part of said cable-lock;

(d) said mount being adapted to abut against said part of said moveable object, and a strap for tightly affixing said bracket to said part of said moveable object;

(e) mating of said brace and said bracket effecting simultaneous engagement of (1) said tongue and said articulations of said brace, and (2) said channel and said guides of said bracket; and (f) said collar having a threaded bore and a set screw that turns into said threaded bore.

9. A U-lock holder for stowing a U-lock on a bicycle frame, said holder comprising a brace for connection to a leg of said U-lock, and a bracket for connection to a strut of said bicycle frame, said brace and said bracket being adapted for engagement and disengagement with and from each other:

(a) said brace including a collar, a tongue, and opposed intermediate articulations between said collar and said tongue;

(b) said bracket including a mount, a channel, a saddle, and opposed intermediate guides between said channel and said saddle;

(c) said collar being adapted to receive and to be affixed to a leg of said U-lock;

(d) said mount being adapted to abut against said strut of said bicycle frame, and a strap for tightly affixing said bracket to said strut of said bicycle frame;

(e) mating of said brace and said bracket effecting simultaneous engagement of (1) said tongue and said articulations of said brace, and (2) said channel and said guides of said bracket;

(f) said collar having a threaded bore and a set screw that turns into said threaded bore.

10. A cable-lock holder for stowing a cable-lock on a bicycle frame, said holder comprising a brace for connection to a leg of said U-lock, and a bracket for connection to a strut of said bicycle frame, said brace and said bracket being adapted for engagement and disengagement with and from each other:

(a) said brace including a collar, a tongue, and opposed intermediate articulations between said collar and said tongue;

(b) said bracket including a mount, a channel, a saddle, and opposed intermediate guides between said channel and said saddle;

(c) said collar being adapted to receive and to be affixed to a leg of said U-lock;

(d) said mount being adapted to abut against said strut of said bicycle frame, and a strap for tightly affixing said bracket to said strut of said bicycle frame;

(e) mating of said brace and said bracket effecting simultaneous engagement of (1) said tongue and said articulations of said brace, and (2) said channel and said guides of said bracket; and (f) said collar having a threaded bore and a set screw that turns into said threaded bore.

* * * * *